(12) United States Patent
Huang et al.

(10) Patent No.: US 9,229,201 B2
(45) Date of Patent: Jan. 5, 2016

(54) NEAR INFRARED LENS

(75) Inventors: Lin Huang, Yuyao (CN); Fujian Dai, Yuyao (CN)

(73) Assignee: Zhejiang Sunny Optics Co. Ltd., Yuyao (CN)

( * ) Notice: Subject to any disclaimer, the term of this patent is extended or adjusted under 35 U.S.C. 154(b) by 0 days.

(21) Appl. No.: 13/501,053

(22) PCT Filed: Aug. 16, 2011

(86) PCT No.: PCT/CN2011/078488
§ 371 (c)(1),
(2), (4) Date: Jun. 28, 2012

(87) PCT Pub. No.: WO2012/174786
PCT Pub. Date: Dec. 27, 2012

(65) Prior Publication Data
US 2014/0111850 A1     Apr. 24, 2014

(30) Foreign Application Priority Data

Jun. 24, 2011   (CN) .......................... 2011 1 0173404
Jun. 24, 2011   (CN) .......................... 2011 2 0218239

(51) Int. Cl.
| G02B 13/14 | (2006.01) |
| G02B 13/00 | (2006.01) |
| G02B 13/04 | (2006.01) |
| G02B 13/18 | (2006.01) |

(52) U.S. Cl.
CPC .............. *G02B 13/14* (2013.01); *G02B 13/004* (2013.01); *G02B 13/008* (2013.01); *G02B 13/04* (2013.01); *G02B 13/18* (2013.01)

(58) Field of Classification Search
CPC ....................................................... G02B 5/005
See application file for complete search history.

(56) References Cited

U.S. PATENT DOCUMENTS

| 5,666,228 | A  | * | 9/1997 | Yamamoto | ..................... 359/651 |
| 7,697,220 | B2 | * | 4/2010 | Iyama | ............................ 359/753 |
| 7,952,818 | B1 | * | 5/2011 | Huang et al. | .................. 359/772 |
| 8,472,124 | B2 | * | 6/2013 | Mihara | .......................... 359/686 |
| 8,576,497 | B2 | * | 11/2013 | Hsu et al. | ....................... 359/714 |

* cited by examiner

*Primary Examiner* — Derek S Chapel
(74) *Attorney, Agent, or Firm* — Z IP Law PLLC; Clair Zopf

(57) ABSTRACT

The present invention discloses a near infrared lens, comprising four groups of lenses along the optical axis from the object space to the image space, wherein, the first lens is a meniscus-shaped lens with negative focal power, with the convex side facing the object space, and has aspherical surfaces; the second lens is a meniscus-shaped lens with positive or negative focal power, with the convex side facing the image space; the third lens is a convexo-convex, convexo-plane, or meniscus-shaped lens with positive focal power, and the convex side of the lens faces the object space if the lens is a convexo-plane or meniscus-shaped lens; the fourth lens is a lens with positive focal power, and has aspherical surfaces. With the above design, the near infrared lens can achieve high imaging quality and low distortion effects with large aperture and wide viewing angle.

9 Claims, 8 Drawing Sheets

NEAR INFRARED LENS

FIELD OF THE INVENTION

The present invention relates to a near infrared lens, in particular to a wide-aperture, wide-angle, and low-distortion near infrared lens composed of four groups of lenses.

BACKGROUND OF THE INVENTION

Optical lenses used in existing digital products are usually ordinary optical lens that has a small viewing angle and low imaging quality. Though wide-angle lenses can overcome that drawback, they have a severe problem, i.e., the image of object is distorted under the optical effect of lens. Due to the fact that only spherical lenses was available in the past, to correct the distortional astigmatism (or referred to as barrel distortion, i.e., the closer the imaging is to the edge, the more severely the image tends to expand and curve linearly), severe meniscus-shaped negative lenses or meniscus-shaped positive lenses have to be added in front of the lens to eliminate the astigmatism. An ordinary wide-angle lens requires 8-10 lenses if the viewing angle of lens is 80 degrees and requires 10-12 lenses if the viewing angle is 100 degrees or higher; as a result, the lens will be too long and too heavy. It is apparently that ordinary wide-angle lenses (especially near infrared wide-angle lenses) are complex in structure and usually have a small relative aperture.

As optical plastic materials are improved and aspherical lens manufacturing technique is popularized, a wide variety of small and light lenses appear. Especially, if aspherical lenses are used, only 3-4 lenses are required if the viewing angle of lens is 80 degrees, only 4-5 lenses are required if the viewing angle of lens is 100 degrees, and only 5-6 lenses are required if the viewing angle of lens is 120 degrees or higher. Apparently, optical lenses are evolving towards miniature and light weight.

If the quantity of lenses is not enough in the lens, it is hard to achieve high imaging quality. To ensure imaging quality, a variety of lenses composed of 4 lenses each are provided in many patents, such as Patent No. CN200610138436.2, CN200710111925.3, CN200710201438.6, CN200810305113.7, and CN200910302836.6, etc. All these lenses employ a structure in which the first lens has positive focal power and other lenses may different in design.

However, it is seen that these lenses are still poor in terms of the wide angle effect, and can't overcome the drawback of image distortion. In addition, all these patents haven't taken account of the effect of temperature fluctuations to the lens. Modern optical instruments usually must have stable performance in a wide range of environmental temperature. Therefore, athermalization design is required for the system. The athermalization design of optical system is to keep the imaging quality of the optical system constant within a wide temperature range with appropriate compensation techniques, usually through three approaches: mechanical active approach, mechanical passive approach, and optical passive approach. Lenses that are commonly used in optical instruments are usually treated in the three approaches to achieve athermalization effect. However, these approaches make the lens structure more complex, and may cause increased lens cost and increased lens size, etc., and therefore are not suitable for portable lenses.

SUMMARY OF THE INVENTION

In view of above problems, the object of the present invention is to overcome the drawbacks existing in the near infrared lens in the prior art, and provide a near infrared lens that has simple lens structure, large aperture, wide angle, and low-distortion features.

To attain the object described above, the present invention employs the following technical schemes:

A near infrared lens, comprising four groups of lenses along the optical axis from the object space to the image space, wherein, the first lens is a meniscus-shaped lens with negative focal power, with the convex side facing the object space, and has aspherical surfaces; the second lens is a meniscus-shaped lens with positive or negative focal power, with the convex side facing the image space; the third lens is a convexo-convex, convexo-plane, or meniscus-shaped lens with positive focal power, and the convex side of the lens faces the object space if the lens is a convexo-plane or meniscus-shaped lens; the fourth lens is a lens with positive focal power, and has aspherical surfaces.

Preferably, the near infrared lens meets the following relational expressions:

$$-0.5 < f/f1 < -0.2 \tag{1}$$

Where, f1 is the focal length of the first lens, and f is the focal length of the entire system;

$$|f2| > |f1| \tag{2}$$

Where, |f1| is the absolute value of focal length of the first lens, and |f2| is the absolute value of focal length of the second lens;

$$f4 > f3 \tag{3}$$

Where, f3 is the focal length of the third lens, and f4 is the focal length of the fourth lens;

$$0.2 < f/f3 < 0.6 \tag{4}$$

Where, f3 is the focal length of the third lens, and f is the focal length of the entire system.

With the above relation of focal length established, the optical properties of the lens can be improved significantly, such as large aperture, wide angle, and low distortion, etc.

Preferably, the near infrared lens further comprises a diaphragm, which is located between the second lens and the third lens.

Further, the near infrared lens meets the following relational expressions:

$$0 < dn3/dt < 1E\text{-}05, -1E\text{-}3 < dn1/dt < -5E\text{-}5, -1E\text{-}3 < dn2/dt < -5E\text{-}5$$

Where, dn1/dt is the variation ratio of refractive index of the first lens to temperature;

Where, dn2/dt is the variation ratio of refractive index of the second lens to temperature;

Where, dn3/dt is the variation ratio of refractive index of the third lens to temperature.

Preferably, the third lens is a glass lens, while the first, second, and fourth lenses are plastic lenses.

Preferably, the near infrared lens further comprises an optical filter, which is located between the second lens and the third lens.

Moreover, the positions of the lenses are preferably fixed.

The present invention achieves large aperture, wide angle, and low distortion features by means of appropriate combination of lenses in different shapes and focal power allocation, and can achieve FNO<1, viewing angle>90degrees, and distortion<5%. Furthermore, the optical properties can be further improved by confining the relationship of focal length among the lens within a specific range. Moreover, an athermalization effect can be achieved effectively by confining the dn1dt relationship.

BRIEF DESCRIPTION OF THE DRAWINGS

The above characteristics and advantages of the present invention will be understood more clearly and easily in the following description of the illustrative embodiments, with reference to the accompanying drawings.

DETAILED DESCRIPTION OF THE EMBODIMENTS

Hereunder the present invention will be further detailed, with reference to the accompanying drawings.

Figure 1:
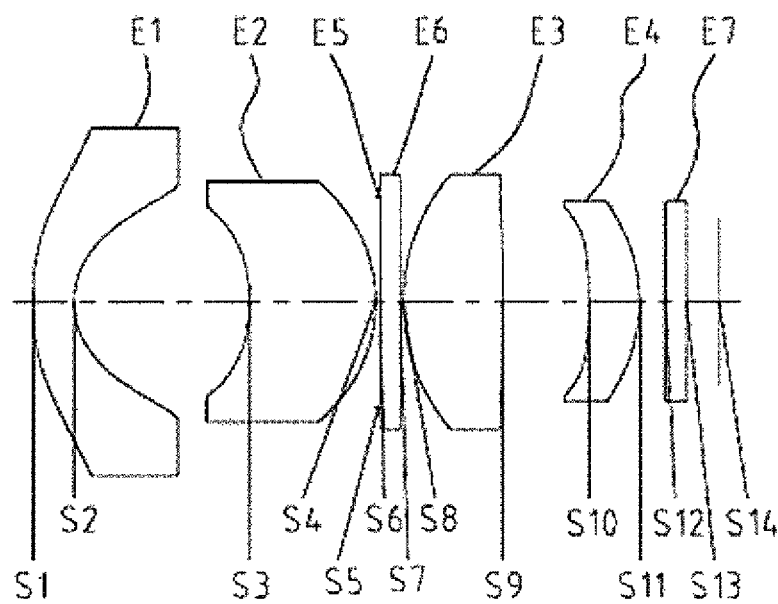
FIG. 1 is a schematic structural diagram of embodiment 1 of the near infrared lens disclosed in the present invention.
Figure 2:
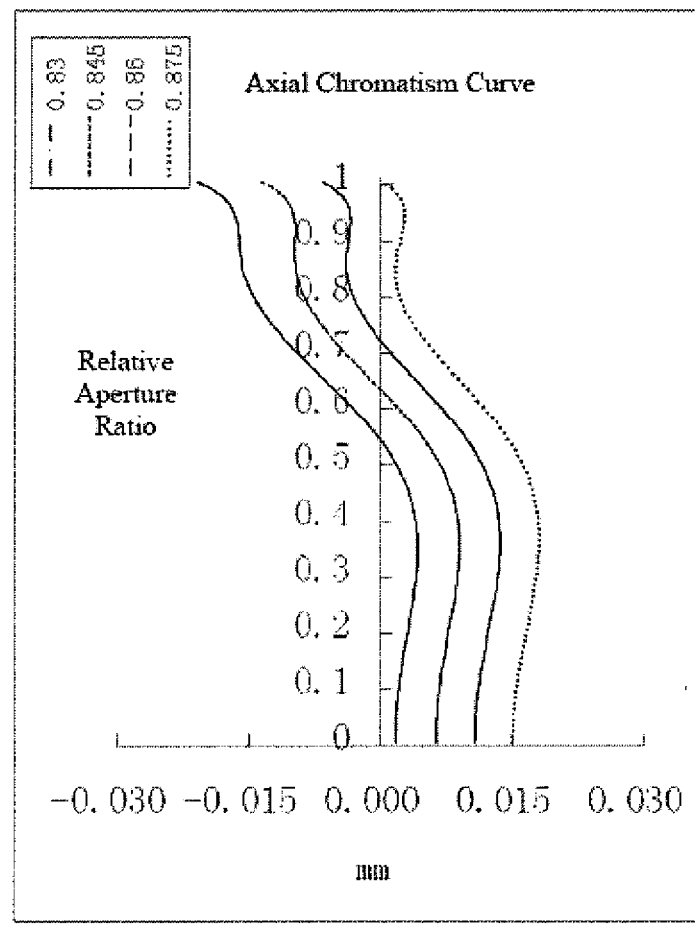
FIG. 2 is an axial chromatism diagram of the near infrared lens in embodiment 1 of the present invention at 25° C.
Figure 3:
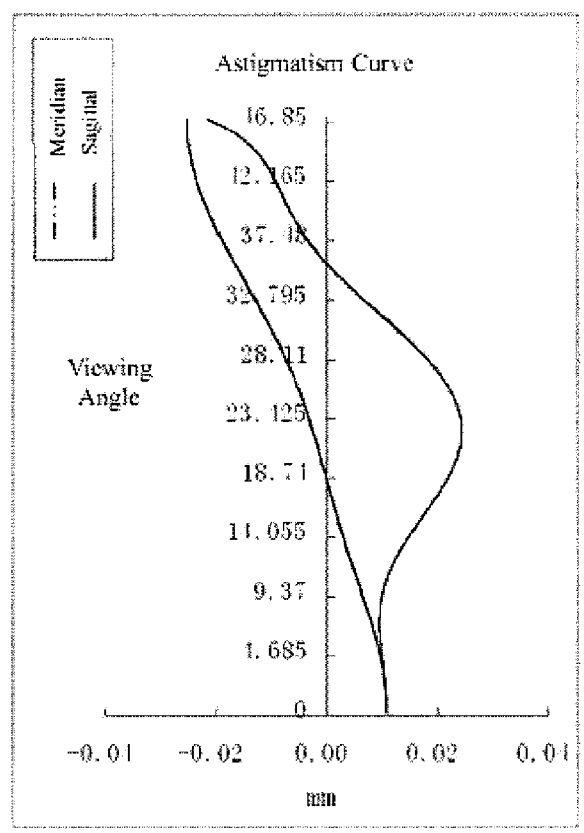
FIG. 3 is an astigmatism diagram of the near infrared lens in embodiment 1 of the present invention at 25° C.
Figure 4:
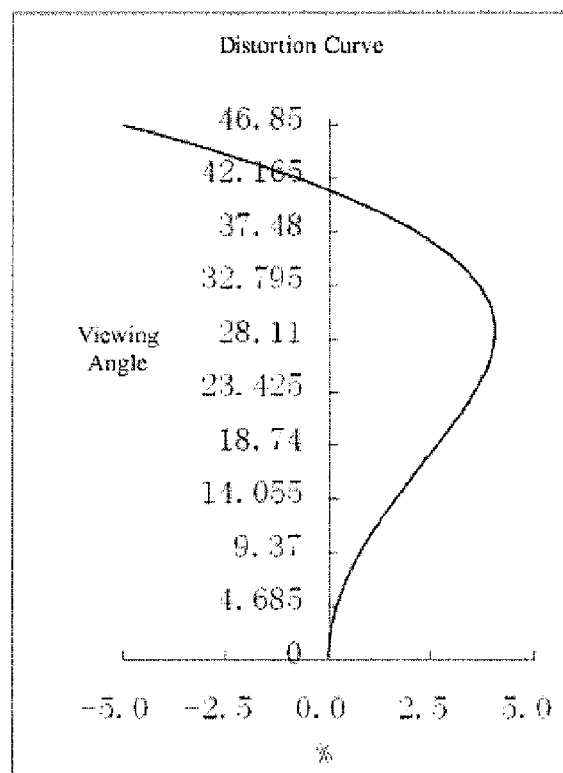
FIG. 4 is a distortion diagram of the near infrared lens in embodiment 1 of the present invention at 25° C.
Figure 5:
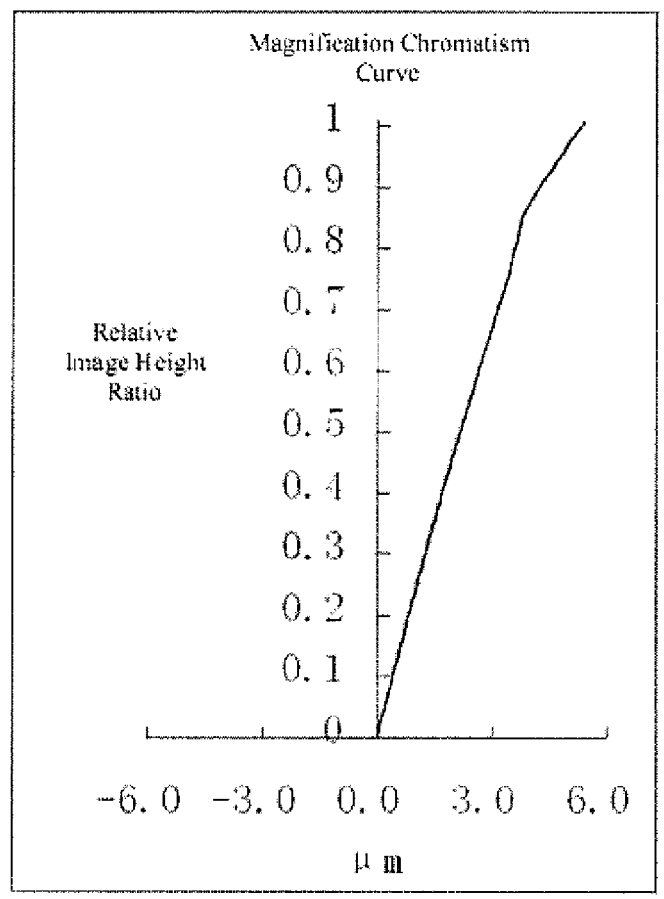
FIG. 5 is a magnification chromatism diagram of the near infrared lens in embodiment 1 of the present invention at 25° C.

FIG. 1 is a schematic structural diagram of embodiment 1 of the near infrared lens disclosed in the present invention.

As shown in FIG. 1, the near infrared lens in the present invention mainly comprises four groups of lenses arranged in sequence along the optical axis from the object space to the image space: the first lens E1 is a meniscus-shaped lens with negative focal power, with the convex side facing the object space, and has aspherical surfaces; the second lens E2 is a meniscus-shaped lens with positive focal power, with the convex side facing the image space; the third lens E3 is a convexo-plane lens with positive focal power, with the convex side facing the object space; the fourth lens E4 is a lens with positive focal power, and has aspherical surfaces.

Moreover, an optical filter E5 and a diaphragm E6 are arranged between the second lens E2 and the third lens E3. With the design of optical filter E5 and diaphragm E6, the incident angle of the main beam into the entire lens can be reduced, and therefore various problems related with brightness resulted from light wavelength shift can be eliminated easily, and the overall imaging quality can be improved. In addition, the positions of all lenses are fixed.

Moreover, the third lens E3 is a glass lens, while the first lens E1, second lens E2, and fourth lens E4 are plastic glasses. With the mixed glass and plastic structure, an athermalization effect can be achieved. In addition, the lenses must meet the following relational expressions:

$$dn1/dt = dn2/dt = -1.022E\text{-}4, dn3/dt = 4.65E\text{-}6$$

Where, dn1/dt is the variation ratio of refractive index of the first glass E1 to temperature;

Where, dn2/dt is the variation ratio of refractive index of the second glass E2 to temperature;

Where, dn3/dt is the variation ratio of refractive index of the third glass E3 to temperature. Hereunder the technical efficacies of the present invention will be described with reference to the drawings and tables, to make the above characteristics and advantages of the present invention understood more clearly and easily.

In embodiment 1, the focal lengths of the lenses are as follows:

$$f1=-9.06; f2=31.46; f3=8.69; f4=11.21; f=3.03.$$

The parts are numbered consecutively along the optical axis, starting from the object space: the mirror surfaces of the first lens E1 are S1 and S2; the mirror surfaces of the second lens E2 are S3 and S4; the mirror surfaces of the optical filter E5 are S5 and S6, and the surface of the diaphragm is S7; the mirror surfaces of the third lens E3 are S8 and S9; the mirror surfaces of the fourth lens E4 are S10 and S11; the mirror surfaces of the chip protection glass E7 are S12 and S13, and the image surface is S14.

Table 1 and Table 2 list the relevant parameters of the lenses in embodiment 1, including the surface type, radius of curvature, thickness, material, effective diameter, and cone factor of the lenses.

System parameters: ⅓" sensor device, aperture value=1.0.

TABLE 1

| SIDE NO. (S) | SURFACE TYPE | RADIUS OF CURVATURE (R) | THICKNESS (D) | MATERIAL | EFFECTIVE DIAMETER (D) | CONE FACTOR (K) |
| --- | --- | --- | --- | --- | --- | --- |
| Object plane | Spherical | Infinite | 1500 | | 3212.67 | |
| S1 | Aspherical | 11.3542 | 1.5 | 1.531/56.0 | 12.70 | 0.0811 |
| S2 | Aspherical | 3.1964 | 6.3628 | | 8.49 | −0.6338 |
| S3 | Aspherical | −5.7885 | 4.575 | 1.531/56.0 | 6.92 | −0.3649 |
| S4 | Aspherical | −5.4490 | 0.0919 | | 8.78 | −0.4237 |
| S5 | Spherical | Infinite | 0.0832 | | 7.73 | |

TABLE 1-continued

| SIDE NO. (S) | SURFACE TYPE | RADIUS OF CURVATURE (R) | THICKNESS (D) | MATERIAL | EFFECTIVE DIAMETER (D) | CONE FACTOR (K) |
|---|---|---|---|---|---|---|
| S6 | Spherical | Infinite | 0.7 | 1.517/64.2 | 7.87 | |
| S7 | Spherical | Infinite | 0.1264 | | 8.15 | |
| S8 | Spherical | 7.1267 | 3.6 | 1.804/46.6 | 9.30 | |
| S9 | Spherical | −145.1524 | 3.1342 | | 9.30 | |
| S10 | Aspherical | −49.7950 | 1.85 | 1.585/29.9 | 6.97 | 164.1206 |
| S11 | Aspherical | −5.7482 | 0.9399 | | 7.31 | −5.7634 |
| S12 | Spherical | Infinite | 0.75 | 1.517/64.2 | 6.91 | |
| S13 | Spherical | Infinite | 1.19 | | 6.75 | |
| S14 | Spherical | Infinite | | | 6.16 | |

Table 2 shows the high-order coefficients A4, A6, A8, A10, A12, A14, and A16 of aspherical surfaces of the aspherical lenses in embodiment 1.

TABLE 2

| Side No. | A4 | A6 | A8 | A10 | A12 | A14 | A16 |
|---|---|---|---|---|---|---|---|
| S1 | 2.3362E−03 | −1.2134E−04 | 2.5030E−06 | −2.4976E−08 | 7.9173E−11 | −5.4554E−13 | 1.6517E−14 |
| S2 | 4.3314E−03 | 1.7707E−04 | −4.2477E−05 | 2.1039E−06 | −4.3143E−08 | −7.1926E−11 | −1.9559E−11 |
| S3 | −1.7167E−03 | −4.8984E−05 | −5.4706E−06 | 2.5763E−08 | −6.0404E−09 | −6.6963E−11 | 4.2800E−11 |
| S4 | −1.7078E−04 | −7.2242E−06 | −3.5677E−07 | 3.4687E−08 | −6.5824E−10 | −8.8487E−12 | 2.0660E−13 |
| S10 | −4.4378E−03 | −2.3426E−05 | −2.2179E−05 | 1.7702E−06 | 4.3139E−09 | 3.0210E−10 | −8.5061E−11 |
| S11 | −1.5712E−03 | −1.5702E−04 | 1.1127E−05 | −2.2575E−07 | 1.8733E−08 | −4.5588E−10 | 3.6891E−12 |

Figure 6:
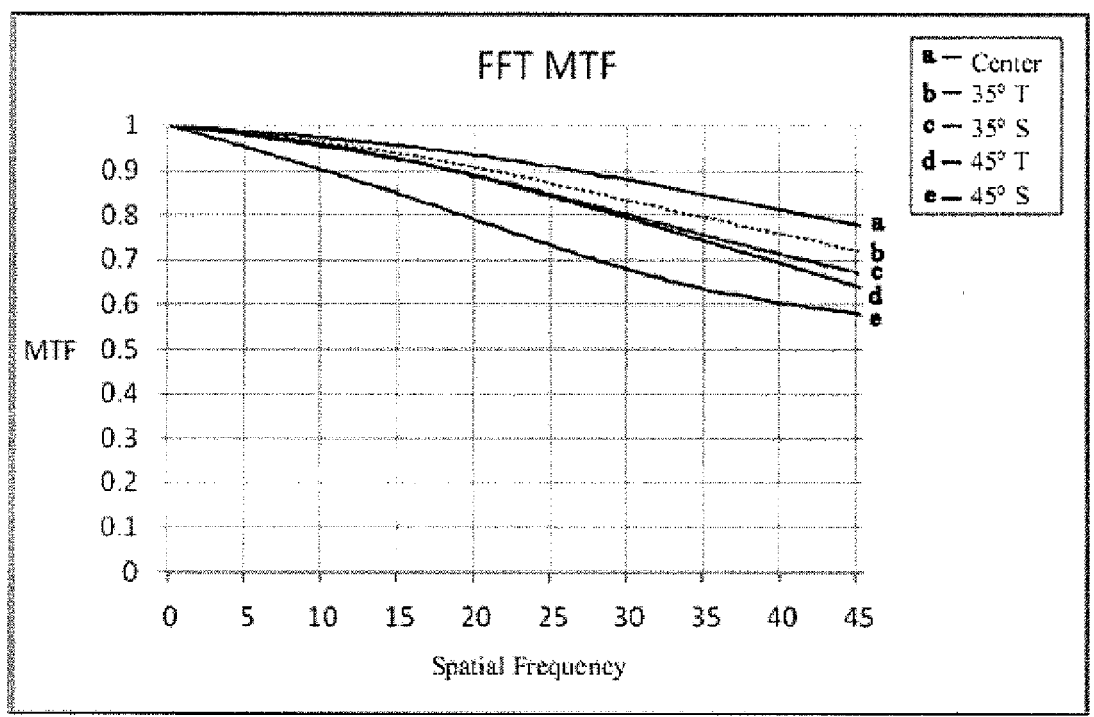
FIG. 6 is a FFT MTF diagram of the near infrared lens in embodiment 1 of the present invention at 25° C.
Figure 7:
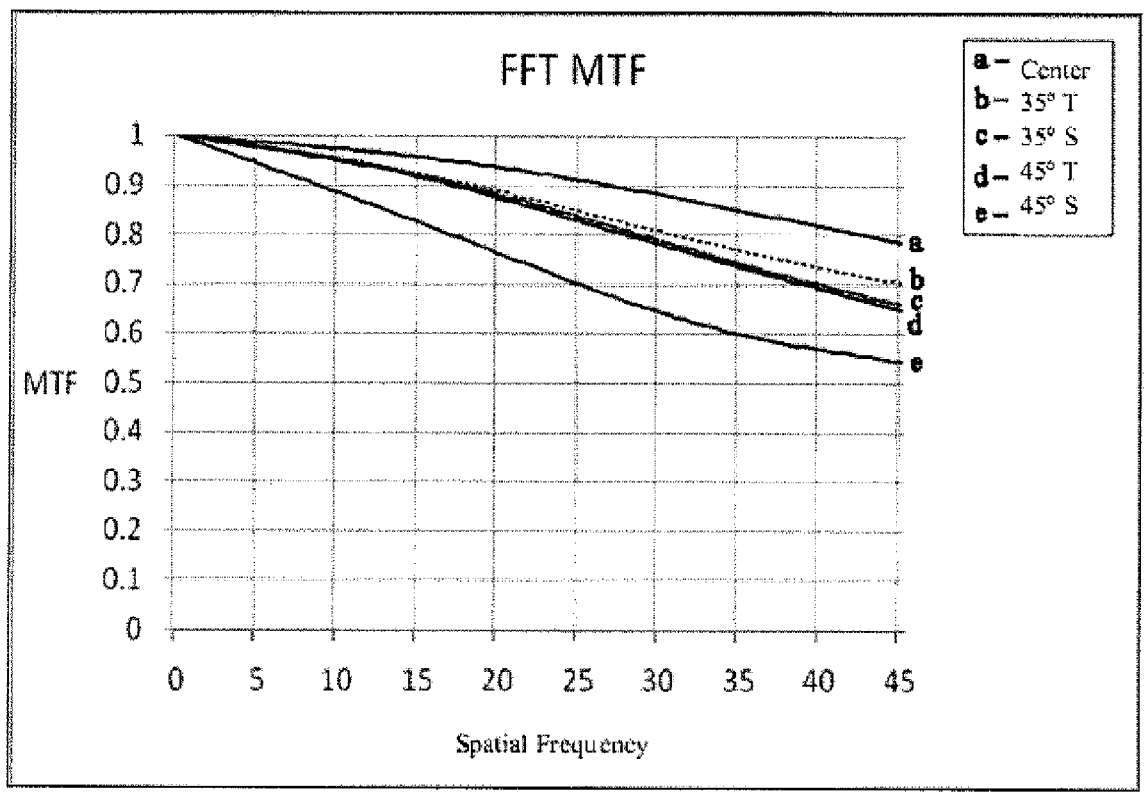
FIG. 7 is a FFT MTF diagram of the near infrared lens in embodiment 1 of the present invention at 5° C.
Figure 8:
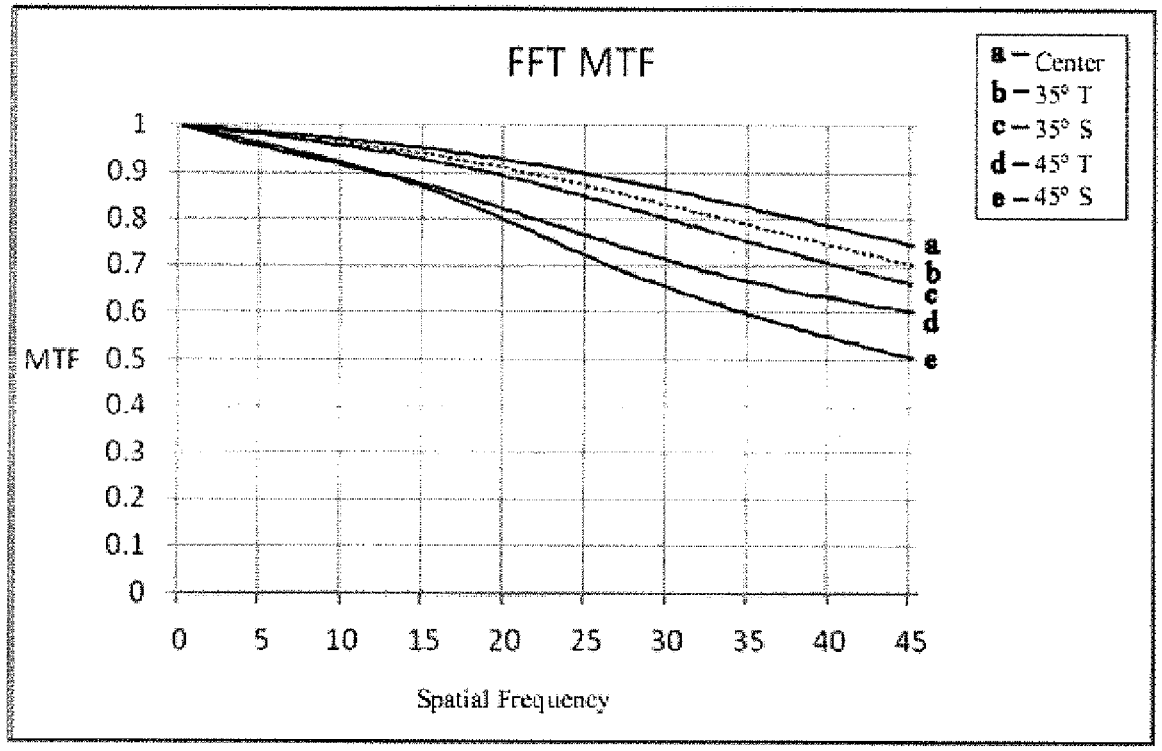
FIG. 8 is a FFT MTF diagram of the near infrared lens in embodiment 1 of the present invention at 50° C.
Figure 9:
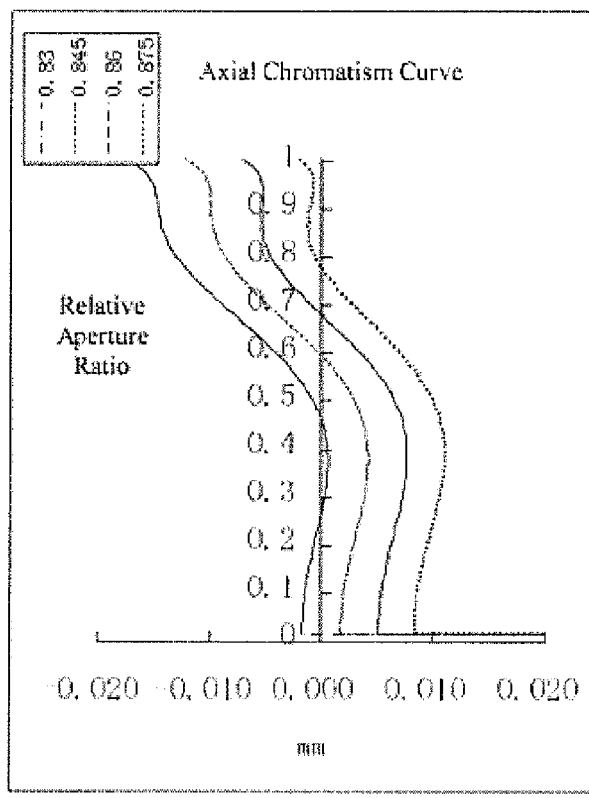
FIG. 9 is an axial chromatism diagram of the near infrared lens in embodiment 2 of the present invention at 25° C.
Figure 10:
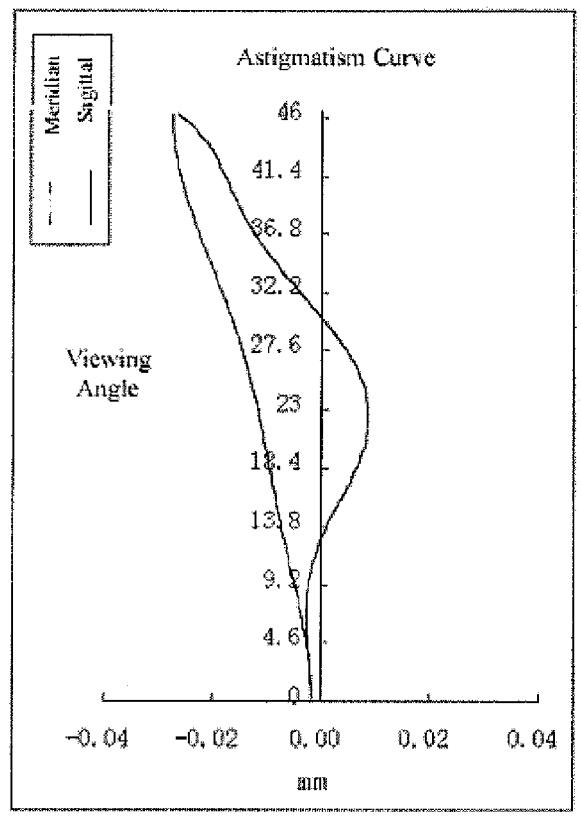
FIG. 10 is an astigmatism diagram of the near infrared lens in embodiment 2 of the present invention at 25° C.
Figure 11:
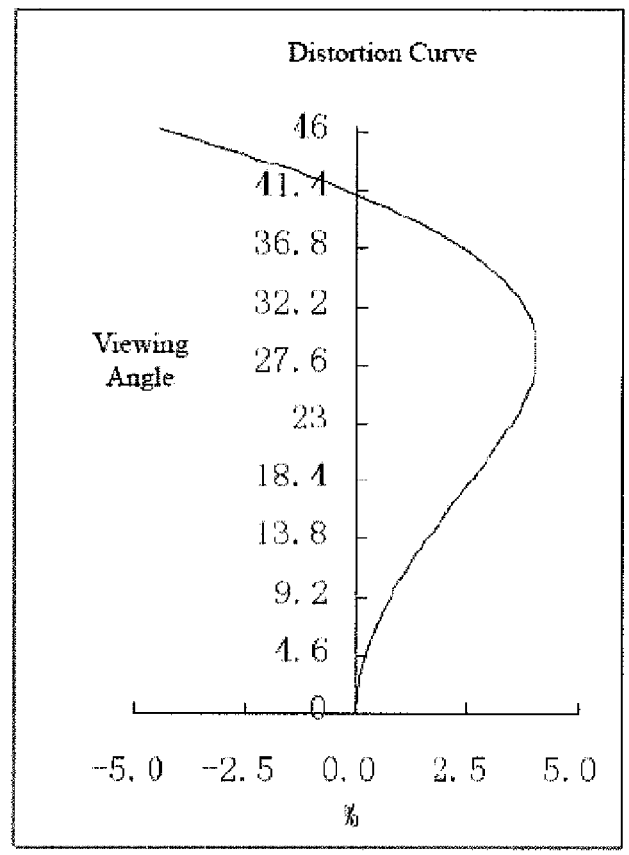
FIG. 11 is a distortion diagram of the near infrared lens in embodiment 2 of the present invention at 25° C.
Figure 12:
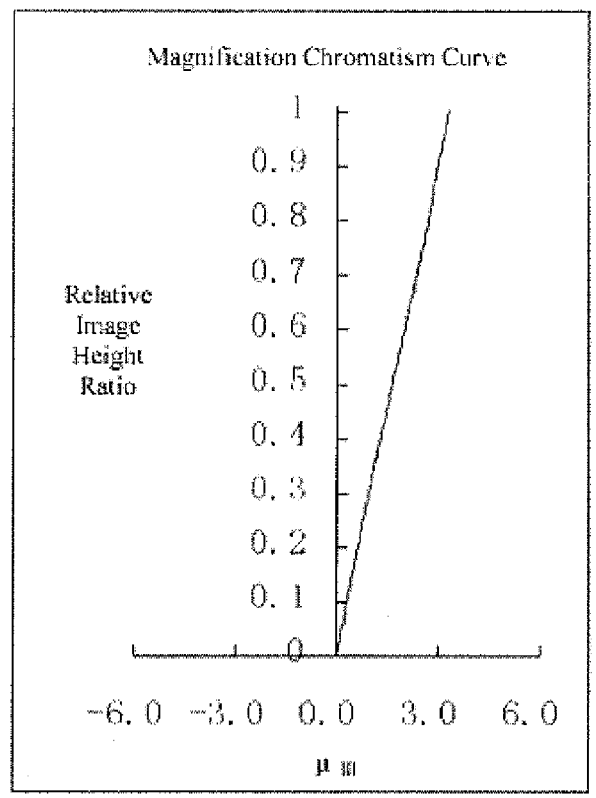
FIG. 12 is a magnification chromatism diagram of the near infrared lens in embodiment 2 of the present invention at 25° C.

FIG. 2-8 show optical curve diagrams of embodiment 1. FIG. 2-5 show the optical properties such as chromatism, astigmatism, distortion, and magnification chromatism of the near infrared lens in the present invention. It is clearly seen from these figures that the near infrared lens in embodiment 1 of the present invention has significantly improved chromatism, astigmatism, and distortion, and greatly improved imaging quality. FIG. 6-8 are FFT MTF diagrams of the near infrared lens in embodiment 1, and are provided to reflect the athermalization feature. It is clearly seen from FIG. 6-8 that the near infrared lens in embodiment 1 has favorable athermalization feature.

Hereunder the near infrared lens provided in embodiment 2 will be further detailed. Similarly, the near infrared lens in embodiment 2 also employs four groups of lenses, which have the same dioptric strength, configuration, and layout as the lenses in embodiment 1, but have different parameters.

The focal lengths of lenses of the near infrared lens in embodiment 2 are as follows:

f1=−6.80; f2=23.53; f3=6.53; f4=8.47; f=2.27

The near infrared lens in embodiment 2 also employs a mixed glass and plastic structure, to achieve athermalization effect. In addition, the lenses meet the following relational expressions:

$dn1/dt=dn2/dt=-1.022E-4$, $dn3/dt=4.65E-6$

Table 3 and Table 4 list the relevant parameters of the lenses in embodiment 2, including the surface type, radius of curvature, thickness, material, effective diameter, and cone factor of the lenses.

System parameters: ¼" sensor device, aperture value=1.0.

TABLE 3

| SIDE NO. (S) | SURFACE TYPE | RADIUS OF CURVATURE (R) | THICKNESS (D) | MATERIAL | EFFECTIVE DIAMETER (D) | CONE FACTOR (K) |
|---|---|---|---|---|---|---|
| Object plane | Spherical | Infinite | 1500 | | 3115.62 | |
| S1 | Aspherical | 8.5032 | 1.1252 | 1.531/56.0 | 9.84 | 0.0828 |
| S2 | Aspherical | 2.3964 | 4.7657 | | 6.32 | −0.6341 |
| S3 | Aspherical | −4.3405 | 3.4350 | 1.531/56.0 | 5.20 | −0.3716 |
| S4 | Aspherical | −4.0844 | 0.0687 | | 6.61 | −0.4228 |
| S5 | Spherical | Infinite | 0.0638 | | 5.79 | |
| S6 | Spherical | Infinite | 0.7 | 1.517/64.2 | 5.90 | |
| S7 | Spherical | Infinite | 0.0993 | | 6.13 | |
| S8 | Spherical | 5.3498 | 2.7057 | 1.804/46.6 | 7.00 | |
| S9 | Spherical | −108.9019 | 2.3504 | | 7.00 | |
| S10 | Aspherical | −37.1690 | 1.3898 | 1.585/29.9 | 5.24 | 166.7381 |
| S11 | Aspherical | −4.3382 | 0.0750 | | 5.51 | −5.7898 |
| S12 | Spherical | Infinite | 0.75 | 1.517/64.2 | 5.21 | |
| S13 | Spherical | Infinite | 1.4021 | | 5.05 | |
| S14 | Spherical | Infinite | | | 4.54 | |

Table 4 shows the high-order coefficients A4, A6, A8, A10, A12, A14, and A16 of aspherical surfaces of the aspherical lenses in embodiment 2.

TABLE 4

| Side No. | A4 | A6 | A8 | A10 | A12 | A14 | A16 |
|---|---|---|---|---|---|---|---|
| S1 | 5.5384E−03 | −5.1121E−04 | 1.8756E−05 | −3.3284E−07 | 1.8796E−09 | −2.2949E−11 | 1.2341E−12 |
| S2 | 1.0293E−02 | 7.4501E−04 | −3.1815E−04 | 2.8033E−05 | −1.0201E−06 | −3.0668E−09 | −1.4562E−09 |
| S3 | −4.0494E−03 | −2.0569E−04 | −4.0892E−05 | 3.3903E−07 | −1.4268E−07 | −3.0926E−09 | 3.2054E−09 |
| S4 | −4.0971E−04 | −3.1534E−05 | −2.7005E−06 | 4.6058E−07 | −1.5426E−08 | −3.8711E−10 | 1.5480E−11 |
| S10 | −1.0552E−02 | −1.0399E−04 | −1.6711E−04 | 2.3516E−05 | 1.0864E−07 | 1.4125E−08 | −6.4622E−09 |
| S11 | −3.7581E−03 | −6.7061E−04 | 8.2684E−05 | −3.0586E−06 | 4.4467E−07 | −1.9207E−08 | 2.0274E−10 |

Figure 13:
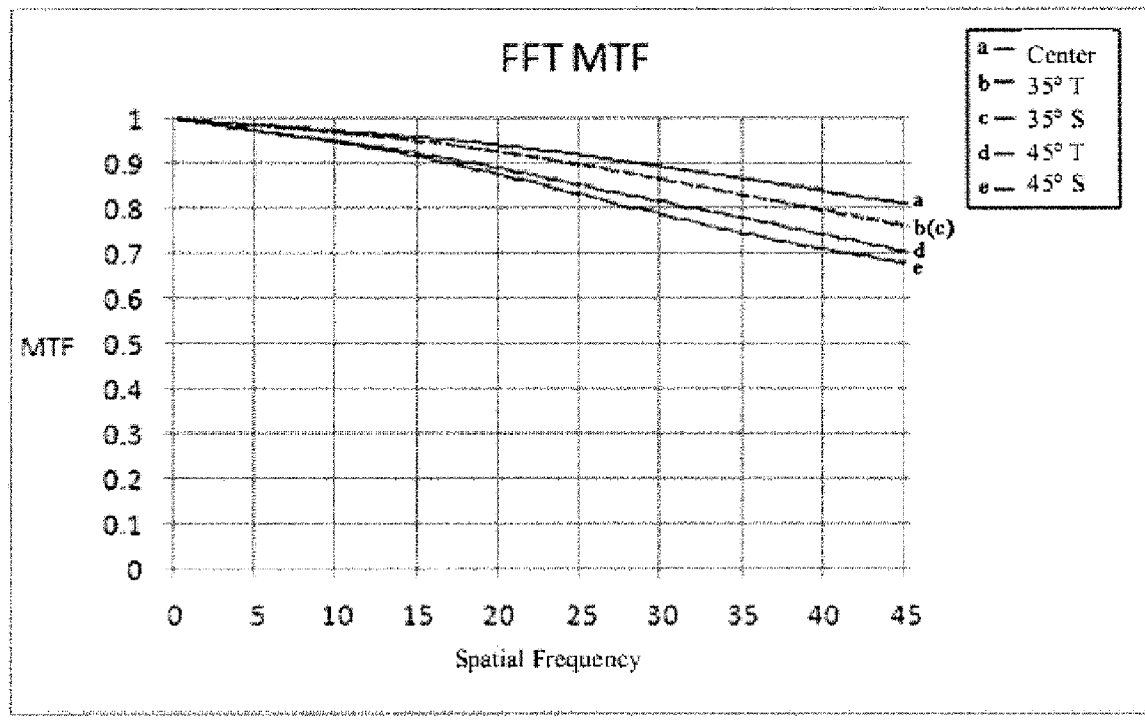
FIG. 13 is a FFT MTF diagram of the near infrared lens in embodiment 2 of the present invention at 25° C.
Figure 14:
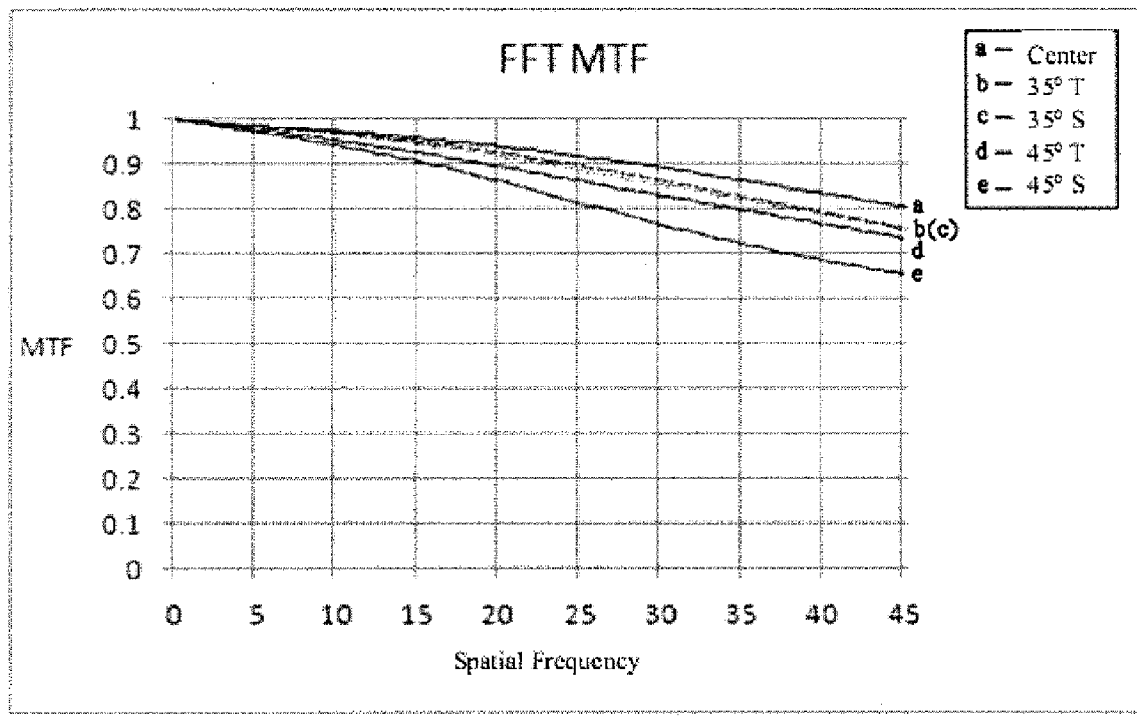
FIG. 14 is a FFT MTF diagram of the near infrared lens in embodiment 2 of the present invention at 5° C.
Figure 15:
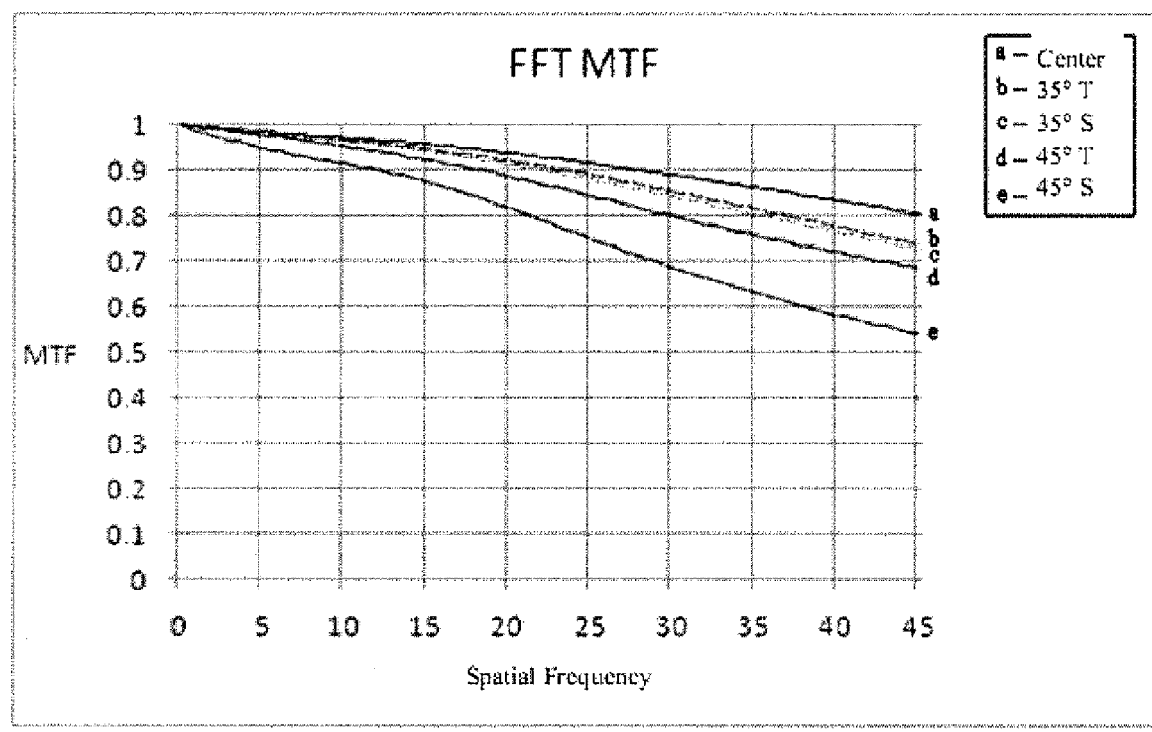
FIG. 15 is a FFT MTF diagram of the near infrared lens in embodiment 2 of the present invention at 50° C.

FIG. 9-15 show optical curve diagrams of embodiment 2. FIG. 9-12 show the optical properties such as chromatism, astigmatism, distortion, and magnification chromatism of the near infrared lens in the present invention. It is clearly seen from these figures that the near infrared lens in embodiment 2 of the present invention has significantly improved chromatism, astigmatism, and distortion, and greatly improved imaging quality. FIG. 13-15 are FFT MTF diagrams of the near infrared lens in embodiment 2, and are provided to reflect the athermalization feature. It is clearly seen from FIG. 13-15 that the near infrared lens in embodiment 2 has favorable athermalization feature.

As indicated by the data in the above optical curve diagrams, the near infrared lens in the present invention has favorable optical effects, and achieves large aperture, wide angle, low distortion, and athermalization features.

The parameters shown in above tables are only illustrative. The composition, radius of curvature, surface spacing, and refractive index of the lenses may vary, and are not limited to the values shown in the above embodiments. However, similar technical effects can be attained.

While the principle of the near infrared lens provided in the present invention is described above in embodiments, those skilled in the art can make various modifications and variations on the basis of the embodiments, without departing from the spirit of the present invention. However, any of such modifications or variations shall be deemed as falling into the protected domain of the present invention. Those skilled in the art shall appreciate that the above description and illustration is only provided to interpret the objects of the present invention, and shall not be deemed as constituting any limitation to the present invention. The protected domain of the present invention is only confined by the claims and their equivalences.

We claim:

1. A near infrared lens, comprising four lenses along the optical axis from an object space to an image space, wherein the four lenses comprise a first lens, a second lens, a third lens, and a fourth lens, wherein the first lens is a meniscus-shaped lens with negative focal power, with a convex side of the first lens facing the object space, and has aspherical surfaces; the second lens is a meniscus-shaped lens with positive or negative focal power, with a convex side of the second lens facing the image space; the third lens is a convexo-convex, convexo-plane, or meniscus-shaped lens with positive focal power, and a convex side of the third lens faces the object space if the third lens is a convexo-plane or meniscus-shaped lens; the fourth lens is a lens with positive focal power, and has aspherical surfaces; and wherein, the near infrared lens meets the following relational expressions:

$$-0.5 < f/f1 < -0.2 \quad (1)$$

where, f1 is the focal length of the first lens, and f is the focal length of the entire system;

$$|f2| > |f1| \quad (2)$$

where, $=f1=$ is the absolute value of the focal length of the first lens, and $=f2=$ is the absolute value of the focal length of the second lens;

$$f4 > f3 \quad (3)$$

where, f3 is the focal length of the third lens, and f4 is the focal length of the fourth lens;

$$0.2 < f/f3 < 0.06 \quad (4)$$

where, f3 is the focal length of the third lens, and f is the focal length of the entire system.

2. The near infrared lens according to claim 1, further comprising a diaphragm, which is located between the second lens and the third lens.

3. The near infrared lens according to claim 1 wherein, the near infrared lens meets the following relational expressions:

$$0 < dn3/dt < 1E\text{-}05, -1E\text{-}3 < dn1/dt < -5E\text{-}5, -1E\text{-}3 < dn2/dt < -5E\text{-}5$$

where, dn1/dt is the variation ratio of refractive index of the first lens to temperature;

where, dn2/dt is the variation ratio of refractive index of the second lens to temperature;

where, dn3/dt is the variation ratio of refractive index of the third lens to temperature.

4. The near infrared lens according to claim 1, wherein, the third lens is a glass lens, while the first, second, and fourth lenses are plastic lenses.

5. The near infrared lens according to claim 1, further comprising an optical filter, which is located between the second lens and the third lens.

6. The near infrared lens according to claim 1, wherein, the positions of the lenses are fixed.

7. The near infrared lens according to claim 1, wherein, the third lens is a glass lens, while the first, second, and fourth lenses are plastic lenses.

8. The near infrared lens according to claim 1, further comprising an optical filter, which is located between the second lens and the third lens.

9. The near infrared lens according to claim 1, wherein, the positions of the lenses are fixed.

* * * * *